(12) United States Patent
Neuhasuer

(10) Patent No.: US 10,112,518 B2
(45) Date of Patent: Oct. 30, 2018

(54) WORK VEHICLE WITH FOLD-OUT TIPPING EDGE

(71) Applicant: WACKER NEUSON LINZ GMBH, Hoersching (AT)

(72) Inventor: Bernd Neuhasuer, Loipersbach (AT)

(73) Assignee: Wacker Neuson Linz GmbH, Hoersching (AT)

(*) Notice: Subject to any disclaimer, the term of this patent is extended or adjusted under 35 U.S.C. 154(b) by 0 days.

(21) Appl. No.: 15/480,338

(22) Filed: Apr. 5, 2017

(65) Prior Publication Data
US 2017/0291526 A1 Oct. 12, 2017

(30) Foreign Application Priority Data
Apr. 8, 2016 (DE) .................... 20 2016 101 868 U

(51) Int. Cl.
| | | |
|---|---|---|
| *B60P 1/28* | (2006.01) | |
| *B60P 1/34* | (2006.01) | |
| *B60P 1/30* | (2006.01) | |

(52) U.S. Cl.
CPC .............. *B60P 1/286* (2013.01); *B60P 1/283* (2013.01); *B60P 1/30* (2013.01); *B60P 1/34* (2013.01)

(58) Field of Classification Search
CPC .. B60P 1/34; B60P 1/26; B60P 3/2245; B60P 1/06; B60P 1/24; B60P 1/30; B60P 1/60; B60P 3/122
USPC ....... 298/22 R, 17 R, 22 C, 19 B, 19 R, 1 A, 298/1 C, 26, 8 R, 20 R, 17.7, 23 M
See application file for complete search history.

(56) References Cited

U.S. PATENT DOCUMENTS

| | | | | |
|---|---|---|---|---|
| 1,058,266 | A * | 4/1913 | Saltzman | ........... B62D 33/0273 296/58 |
| 3,316,019 | A * | 4/1967 | Flowers | .................. B60P 1/165 105/272 |
| 4,067,470 | A * | 1/1978 | Felburn | ...................... B65F 3/14 414/469 |
| 6,059,513 | A * | 5/2000 | Goby | ...................... B60P 1/006 414/517 |
| 6,189,976 | B1 * | 2/2001 | Lawson | .................... B60P 1/26 298/1 B |

FOREIGN PATENT DOCUMENTS

| | | |
|---|---|---|
| DE | 8910379.3 U1 | 12/1989 |
| DE | 10130530 C1 | 12/2002 |

(Continued)

*Primary Examiner* — D Glenn Dayoan
*Assistant Examiner* — Sunsurraye Westbrook
(74) *Attorney, Agent, or Firm* — HDC Intellectual Property Law, LLC

(57) ABSTRACT

A skip apparatus for a working vehicle has a skip that is pivotable upward about a carrying axle and that has a pouring edge via which pourable material is able to be poured out of the skip. The skip apparatus additionally has an emptying device which is pivotable relative to the skip about a pivot axle on the skip during a pivoting movement. The emptying device has an inlet side and an outlet side. The inlet side is arranged in a region of the pouring edge such that the pourable material, which is poured out of the skip via the pouring edge, passes into the emptying device via the inlet side. The pivoting movement of the emptying device is guided in a defined manner by a guiding device. A working vehicle having such a skip apparatus also is provided.

9 Claims, 6 Drawing Sheets

(56) References Cited

FOREIGN PATENT DOCUMENTS

| DE | 102010049986 A1 | 4/2012 |
|----|-----------------|--------|
| DE | 202014101150 U1 | 6/2014 |
| EP | 2218835 A1 | 8/2010 |

\* cited by examiner

WORK VEHICLE WITH FOLD-OUT TIPPING EDGE

BACKROUND OF THE INVENTION

1. Field of the Invention

The invention relates to a working vehicle, in particular to what is referred to as a dumper.

2. Discussion of the Related Art

Working vehicles in the form of dumpers. Particularly mobile dumpers of this type have a vehicle front part and a vehicle rear part and also a joint, arranged between the vehicle front part and the vehicle rear part, for coupling the vehicle rear part to the vehicle front part such that the vehicle front part and the vehicle rear part are movable relative to one another about at least one vertical axis of the working vehicle. Since the vehicle front part and the vehicle rear part can thus carry out a kind of "articulated movement" relative to one another, the expression articulated dumpers is also used in this connection. The articulation between the vehicle front part and the vehicle rear part allows a steering movement and thus cornering, since the wheels, or wheel axles, arranged on the vehicle front part and vehicle rear part can be set at an angle to one another.

Correspondingly, dumpers (relatively small articulated dump trucks) are also known, in which a drive unit (vehicle rear part) is coupled to a skip unit (vehicle front part) via an articulated joint in order to allow an articulated movement and thus steering.

In order to improve off-road capability, it is furthermore known for the joint to be configured such that it also allows a relative movement between the vehicle front part and the vehicle rear part, or drive unit and skip unit, about the longitudinal axis of the working vehicle. This relative movement is also known as "swiveling". Such a combined joint is accordingly also known as an "articulated swivel joint". An articulated swivel joint is known for example from DE 101 30 530 C1 or EP 2 218 835 A1. The structure of an articulated swivel joint is described in particular in EP 2 218 835 A1, and so a detailed description is not necessary at this point.

In dumpers, a skip that is pivotable upward relative to the chassis of the skip unit is provided on the skip unit, said skip serving for example to hold loose bulk materials, rocks, earth, rubble etc.

Dumpers are frequently also used to transport liquid concrete. This is appropriate for example at sites in difficult terrain, with narrow access routes or in the case of concrete work in large spaces (halls) in which, on account of the spatial conditions, it is not possible to transport the concrete with conventional concrete mixing vehicles. The liquid concrete is introduced into the skip of the dumper and poured out at the destination by raising the skip.

When the liquid concrete is tipped out, it flows directly onto the ground over the front edge (pouring edge) of the skip. Since the pouring edge of a dumper is a certain height above the ground, it is not possible to prevent the concrete from splashing when it hits the ground. As a result, it is possible for the dumper and even the surroundings of the concreting location to be soiled. Laborious cleaning work may then consequently be necessary.

In order to solve this problem, DE 20 2014 101 150 U1 discloses providing a skip having a chute mounted in a linearly movable manner, wherein the chute extends the skip beyond the pouring edge thereof in an unloading position, while the chute can be retracted in a transport position of the skip.

However, this solution has the problem that the front edge of the chute is pivoted a very long way downward when the skip is pivoted up and can dip into the liquid concrete already emptied out, i.e. be additionally soiled.

SUMMARY OF THE INVENTION

The invention is based on the object of specifying a working vehicle having a skip apparatus, which is also particularly suitable for transporting concrete and reduces soiling of the working vehicle.

According to and aspect the invention, the object is achieved by providing a skip apparatus for a working vehicle, having a skip that is pivotable upward about a carrying axle and that has a pouring edge via which pourable material is able to be poured out of the skip. The skip apparatus additionally has an emptying device which is pivotable relative to the skip about a pivot axle on the skip during a pivoting movement. The emptying device has an inlet side and an outlet side. The inlet side is arranged in a region of the pouring edge such that the pourable material, which is poured out of the skip via the pouring edge, passes into the emptying device via the inlet side. The pivoting movement of the emptying device is guided in a defined manner by a guiding device.

The skip can thus be pivoted upward in a known manner from a transport position (horizontal orientation in the starting position of the skip) into an unloading position (upwardly pivoted position). To this end, a hydraulic device (piston-cylinder unit) can be provided. Likewise, the skip can also be pivoted with the aid of an electric linear drive.

The pouring edge is provided on the top side of the skip and can extend for example parallel to the carrying axle of the skip. When the skip is pivoted upward, the pouring edge is lowered as a result of the pivoting movement about the carrying axle, such that the bulk material can pass out via the pouring edge. In the transport state, that is to say, with the skip pivoted downward, the pouring edge is accordingly up, in order to prevent the bulk material from passing out.

The emptying device adjoins the pouring edge of the skip, such that, when the skip is pivoted up, the pourable material, for example the liquid concrete, passes out of the skip via the pouring edge and into the emptying device.

At the same time as the skip is pivoted upward, the emptying device also pivots, specifically relative to the skip. The pivoting movement of the emptying device is in this case guided in a defined manner by the guiding device. This means that the relative position between the emptying device and the skip is not fixed but changes while the skip is being pivoted, on account of the action of the guiding device.

In particular, it is possible for the emptying device to be pivoted by the guiding device in a direction which is opposite to the pivoting movement of the skip. If—with respect to a particular direction of view—the skip is pivoted upward for example counterclockwise about the carrying axle, a clockwise pivoting movement of the emptying device relative to the skip takes place on account of the action of the guiding device.

This effect can also be abstracted for example as follows: it should be assumed that the bulk material contained in the skip is distributed evenly and thus forms a virtual horizontal plane at its surface. It should furthermore be assumed that, on being poured via the emptying device, the pourable material likewise forms an even surface which can be considered a virtual plane in the emptying device. The two virtual planes in the skip (surface of the bulk material) and in the emptying device (here too: surface of the bulk material flowing through the emptying device) are at an obtuse angle to one another. When the skip is raised, the angular position of the emptying device with respect to the skip changes and thus the angle between the two virtual planes. In particular, the obtuse angle becomes increasingly larger and can reach an angle of 180° (both virtual planes extend in the same direction) or above.

In this case, during a pivoting movement of the skip about the carrying axle, a change in height (lowering) of the outlet side of the emptying device can be less than a change in height (lowering) of the pouring edge. Thus, as a result of the pivoting movement of the emptying device being guided, it is possible for the outlet side not to be displaced too far downward and so penetration of the outlet side nun the already cast concrete can be avoided.

The outlet side of the emptying device can be configured as an outlet edge. The outlet edge then assumes the function of the pouring edge provided on the skip and allows the bulk material to be let out in a defined manner.

The inlet side of the emptying device can be provided at least partially beneath the pouring edge of the skip in order to reliably receive all of the bulk material that passes out of the skip via the pouring edge and to guide it through the emptying device to the outlet side thereof.

The designations such as "up", "down" or "beneath" relate to an orientation of the working vehicle in the operational state, in which bulk material can be transported in the skip.

The outlet side of the emptying device can be at a greater horizontal distance from the carrying axle than the pouring edge of the skip. As a result, it is possible to remove the outlet point of the bulk material from the working vehicle itself and as a result to reduce soiling, for example of the wheel axle is.

Likewise, it is possible for the outlet side to be arranged at a lower height than the pouring edge. As stated in conjunction with the prior art, with a pouring edge positioned relatively far up, there is the problem of the concrete splashing away to all sides during casting, thereby soiling the working vehicle. The lower the outlet point (outlet side), the lesser the splashing effect.

The emptying can have a channel extending between the inlet side and the outlet side. Thus, the emptying device can have a sheet-metal part of relatively simple construction, with which the channel for guiding the bulk material passing out of the skip is realized.

The channel can have a planar bottom region, and side regions that rise obliquely to side walls from the planar bottom region. By way of corresponding bends in the bottom surface of the channel, a V-shaped profile of the channel can also be achieved, in order for example to focus the bulk material toward the middle of the outlet side. This means that the bulk material can enter over the entire width of the inlet side provided at the pouring edge of the skip, but, as it continues to flow through the emptying device, is focused toward the middle in order to let the bulk material out in a more jet-like manner on the outlet side.

The skip can be carried by a carrying device on which the carrying axle is provided, wherein the guiding device is arranged so as to act between the carrying device and the emptying device, in order to guide the pivoting movement of the emptying device relative to the skip. The guiding device can for example support the emptying device at the carrying device, in order to achieve the desired pivoting movement of the emptying device.

In particular, the guiding device can have a control device which couples the emptying device to the carrying device.

In one embodiment, the control device can have at least one control element which is fastened fixedly to the emptying device and is pivotable relative to the carrying device.

The control element can be realized for example as a laterally attached control rod. For better stability, it is possible to provide for example two laterally attached control rods, specifically one in the left-hand region of the working vehicle and one in the right-hand region of the working vehicle.

The control element can be held on the carrying device in a pivotable manner via a control arm axle, wherein the control arm axle extends, parallel to the carrying axle and at a distance therefrom. As a result of the distance between the control arm axle and the carrying axle, the desired kinematics are created with regard to the emptying device which are appropriate when pivoting out the skip mounted on the carrying excess.

The control element is not fastened fixedly to the emptying device but simply only fastened, and in particular also fastened so as to be pivotable relative to the emptying device.

The guiding device can be Fastened releasably to the emptying device and/or to the carrying device, that is to say be removable from the emptying device and/or from the carrying device, such that the emptying device is then freely pivotable relative to the skip. This means that the skip apparatus can be used in one mode of operation in which the desired coupling of the pivoting movement of the emptying device is realized, while, in another operating mode, the emptying device is not guided relative to the skip, i.e. is freely pivotable. In the latter operating state, the position of the emptying device is determined for example solely by the force of gravity, such that the emptying device is suspended on the skip (pivot axle) in a manner pivoted freely downward.

In particular, it is possible for example for the control element to be fastened releasably to the emptying device and to the carrying device, such that operation without the guiding device or control elements is also possible.

The geometry made up of the position of the pivot axle, position of the carrying axle, position of the control arm axles on the carrying device and on the emptying device, the distance between the control arm axle on the carrying device and a fastening point (for example a further control arm axle) of the control element on the emptying device can be selected such that the outlet side, or outlet edge, of the emptying device changes less in terms of height during a pivoting movement of the skip about the carrying axle than the pouring edge. The cooperation of the axles, also to be understood as joints, and the distances thereof from one another can accordingly also be understood as a linkage, with the aid of which the desired relative movement of the emptying device relative to the skip is achieved.

The above-described skip apparatus can be used in particular in a working vehicle, wherein the working vehicle has a drive unit with a drive, and also a skip unit which has the skip apparatus, and a joint, arranged between the drive unit and the skip unit, for coupling the drive unit to the skip unit such that the drive unit and the skip unit are movable relative to one another about at least one vertical axis of the working vehicle.

On the drive unit, it is possible for a driver's protective structure, in particular a driver's cab, to be arranged, within which there is arranged a driver's seat that can be for example rotatable.

The driver's protective structure can meet the remaining safety features in particular a fall over protection system (FOPS) and a rollover protection system (ROPS). In addition, a correspondingly stable structure, for example a bar, can be provided in the frame of the driver's protective structure. Rather than a driver's cab, it is also possible for a simple rollover protection bar to be formed on the drive unit.

The joint arranged between the drive unit and the skip unit is suitable for allowing a relative movement about the vertical axis (articulation), in order to create a steering movement. The pivot point between the drive unit and skip unit can its this case be forced by a steering apparatus that acts between the drive unit and the skip unit. With the aid of the steering apparatus, cornering of the working vehicle can be realized.

Furthermore, the joint can also be configured to allow relative mobility about the longitudinal axis, also referred to as "swiveling". The relative movement both about the longitudinal axis and about the vertical axis is accordingly in each case a type of pivoting movement. In order to allow a pivoting movement about the longitudinal axis of the working vehicle in addition to the movement about the vertical axis, the joint can in particular be an articulated swivel joint.

For example, the articulated swivel joint can have a lower ball joint that connects the skip unit to the drive unit, and an upper ball joint, arranged above the lower ball joint, that connects the skip unit to the drive unit. A first component of the upper ball joint can be fixedly connected to the skip unit, while a second component of the upper ball joint can be connected to the drive unit via a rod that is movable relative to the drive unit. The rod can be pivotable relative to the drive unit.

The skip can—as already explained above—be pivotable about the carrying axle. In this case, the carrying axle can be arranged to one side of a wheel axle, wherein the skip extends from one side of the wheel axle to the other side of the wheel axle. Thus, in a starting position, the skip extends in particular in the longitudinal direction or direction of travel of the working vehicle. In particular, in this starting position, the carrying axle can be located in front of or behind the wheel axle and be arranged parallel thereto.

In this starting position, the skip is then arranged above the wheel axis and extends over the latter. In this case, it is desirable to keep the center of gravity of the skip, even in the filled state, as directly above the wheel axle as possible, such that the load can be supported substantially largely directly via the wheel axle.

The carrying device, together with the carrying axle and the skip, can, in one embodiment, be pivotable about the vertical axis relative to the wheel axle, that is to say relative to the chassis of the skip unit. In this way, it is possible to rotate the skip about the vertical axis and to orient the pouring edge in a suitable manner. The emptying device adjoining the pouring edge is in this case likewise oriented in order to let the bulk material out in a targeted manner. In particular, it is possible for the bulk material to also be let out, for example, laterally next to the working vehicle.

BRIEF DESCRIPTION OF THE DRAWINGS

These and further advantages and features of the invention are described in more detail in the following text by way of examples with the aid of the accompanying figures, in which.

DETAILED DESCRIPTION

Figure 1:
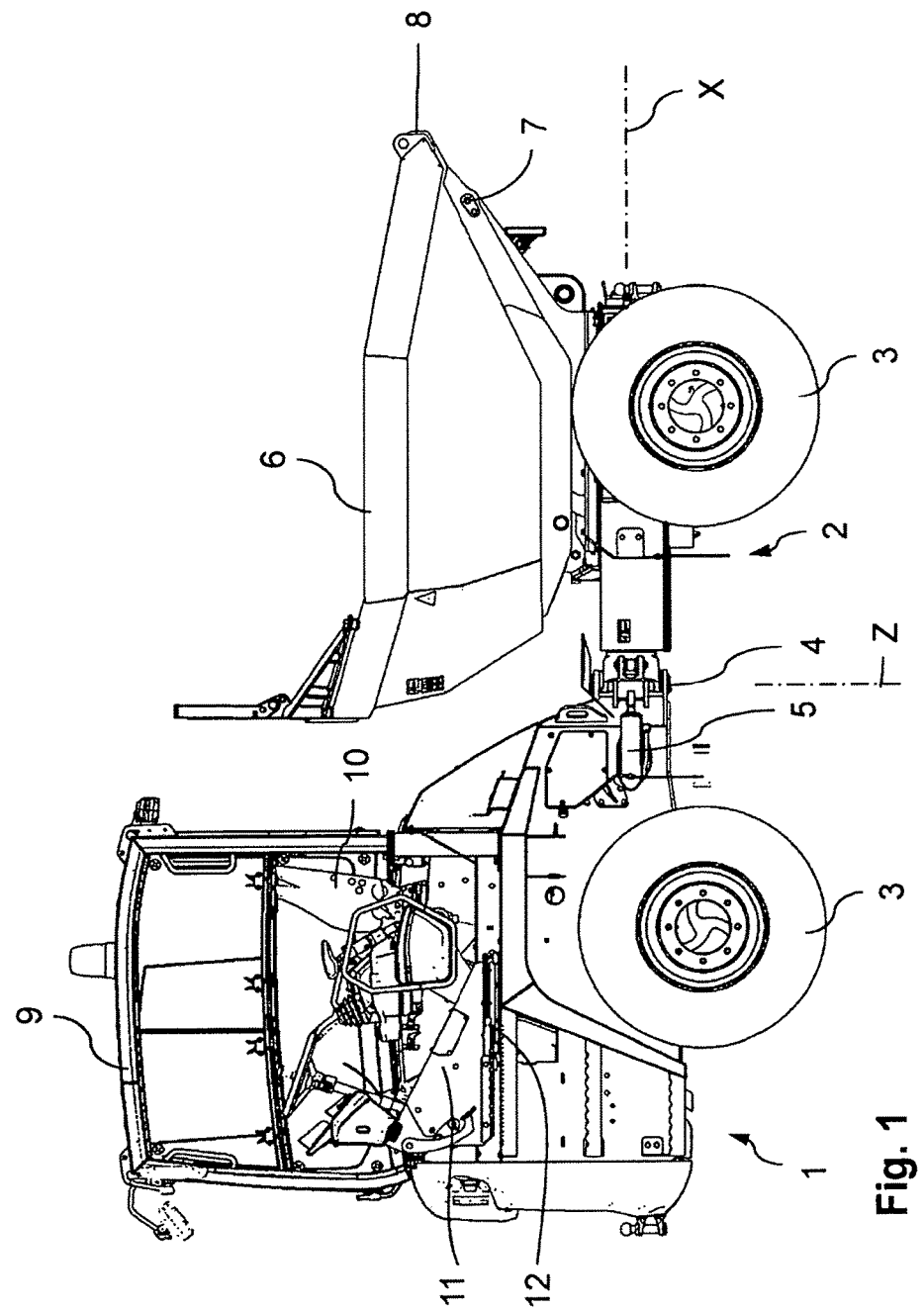
FIG. 1 shows a side view of a working vehicle with a rotatable driver's seat in the forward position.

FIG. 1 shows a side view of what is known as a dumper, serving as a working vehicle. Dumper is the designation given for example to relatively small articulated dump trucks.

The dumper shown in FIG. 1 and FIG. 2 has a rotatable driver's station, as explained below. The emptying device according to the invention can, of course, also be used in a dumper with a stationary driver's station, however.

The working vehicle has a drive unit 1 and a skip unit 2 which each carry a rigid wheel axle 3 having wheels. Arranged between the drive unit 1 and the skip unit 2 is what is known as an articulated swivel joint 4. Such an articulated swivel joint 4 has already been described above and serves to couple the drive unit 1 to the skip unit 2 such that the drive unit 1 and the skip unit 2 are movable, or pivotable, relative to one another both about a vertical axis Z and about a longitudinal axis X.

Pivoting about the vertical axis Z allows a steering movement such that the two wheel axles 3 can be set at an angle with respect to one another (known as an articulated movement).

Mobility about the longitudinal axis X is also referred to as "swiveling" and considerably increases the off-road capability of the working vehicle.

The pivoting movement about the vertical axis Z is brought about by a steering apparatus which comprises a hydraulic piston-cylinder unit 5. With the aid of the piston-cylinder unit 5, the angular position between the drive unit 1 and the skip unit 2 can be set.

The skip unit 2 carries a skip 6 on its top side. The skip 6 is pivotable, or raiseable, about a carrying axle 7 by a hydraulic raising mechanism that is not illustrated in FIG. 1. As a result, the skip 6 carrying for example loose bulk material can be emptied easily via a pouring edge 8. Furthermore, the skip 6 can be mounted on the skip unit 2 so as to be rotatable about a vertical axis (axis A in FIG. 6).

Constructed on the drive unit 1 is a driver's protective structure 9 which encloses, inter alia, a driver's seat 10 and various operating elements (steering wheel, joystick, gas and brake pedals). The driver's protective structure 9 is formed, inter alia, by bars which provide rollover protection, realizing a ROPS/FOPS structure.

The driver's seat 10 is fastened to a rotary mount 11 which also carries the further operating elements. The rotary mount 11 is mounted in a rotatable manner relative to the rest of the drive unit 1 via a plain hearing 12. Alternatively to the plain bearing 12, the rotary mount 11 can also be mounted by means of a ball bearing or with the aid of relatively small rollers.

Figure 2:
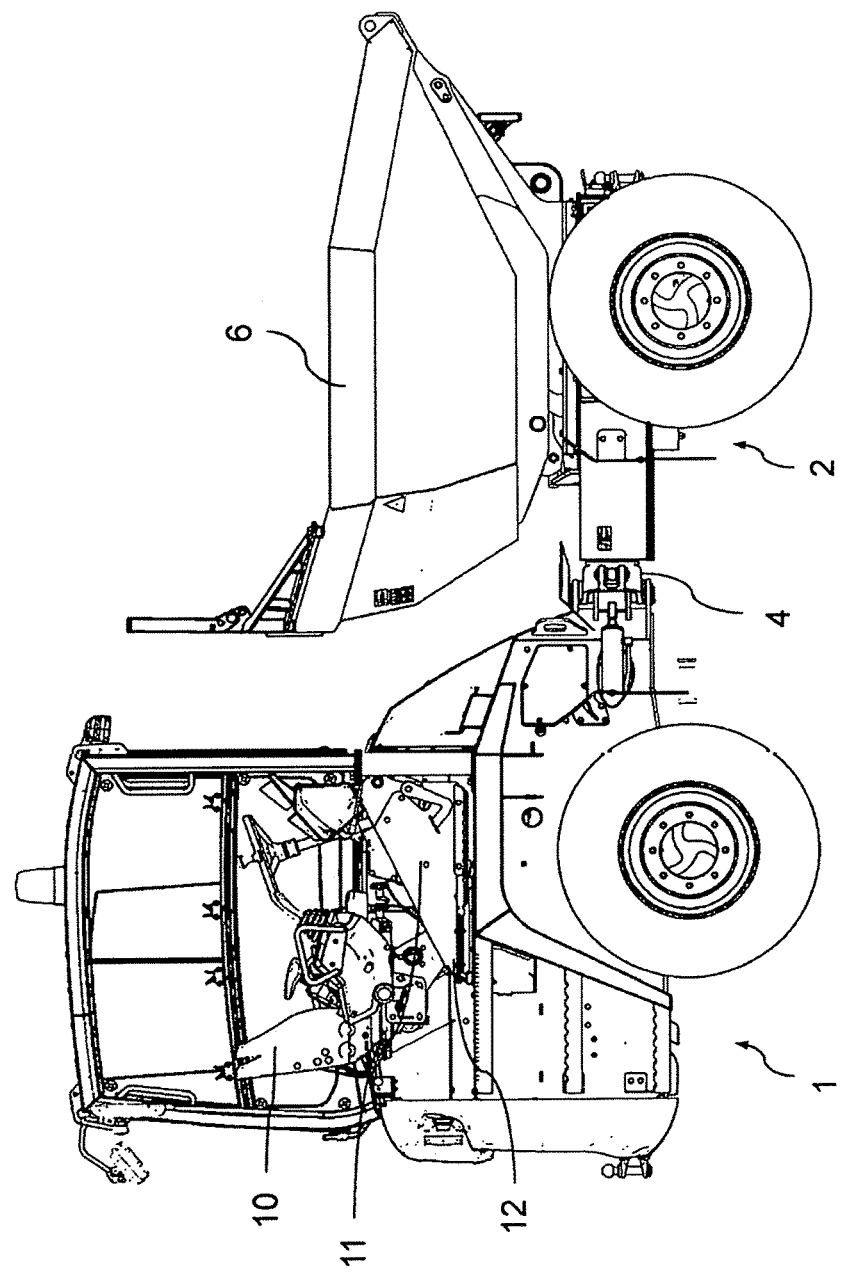
FIG. 2 shows the working vehicle with the driver's seat in the rearward direction.

In particular, the rotary mount 11 is pivotable through 180° between a forward position and a rearward position, as shown in FIG. 1 and FIG. 2.

FIG. 1 shows the rotary mount with the driver's seat 10 in the forward position. A driver sitting on the driver's seat 10 looks forward in the direction of travel, away from the skip 6.

FIG. 2, shows the same working vehicle, but with the rotary mount 11 in a rotated position and thus the driver's seat 10 in the rearward position. In this case, a driver sitting on the driver's seat 10 looks in the rearward position, toward the skip 6.

As FIG. 1 and FIG. 2 show, in this case not only the driver's seat 10 is pivoted but also the entire driver's station with all of the operating elements.

Although a dumper, serving as working vehicle, with a driver's seat that is pivotable in the direction of travel and in the rearward direction, has thus been described by way of FIG. 1 and FIG. 2, a dumper with a fixed, non-pivotable driver's seat can also be used as working vehicle according to the invention.

Figure 3:
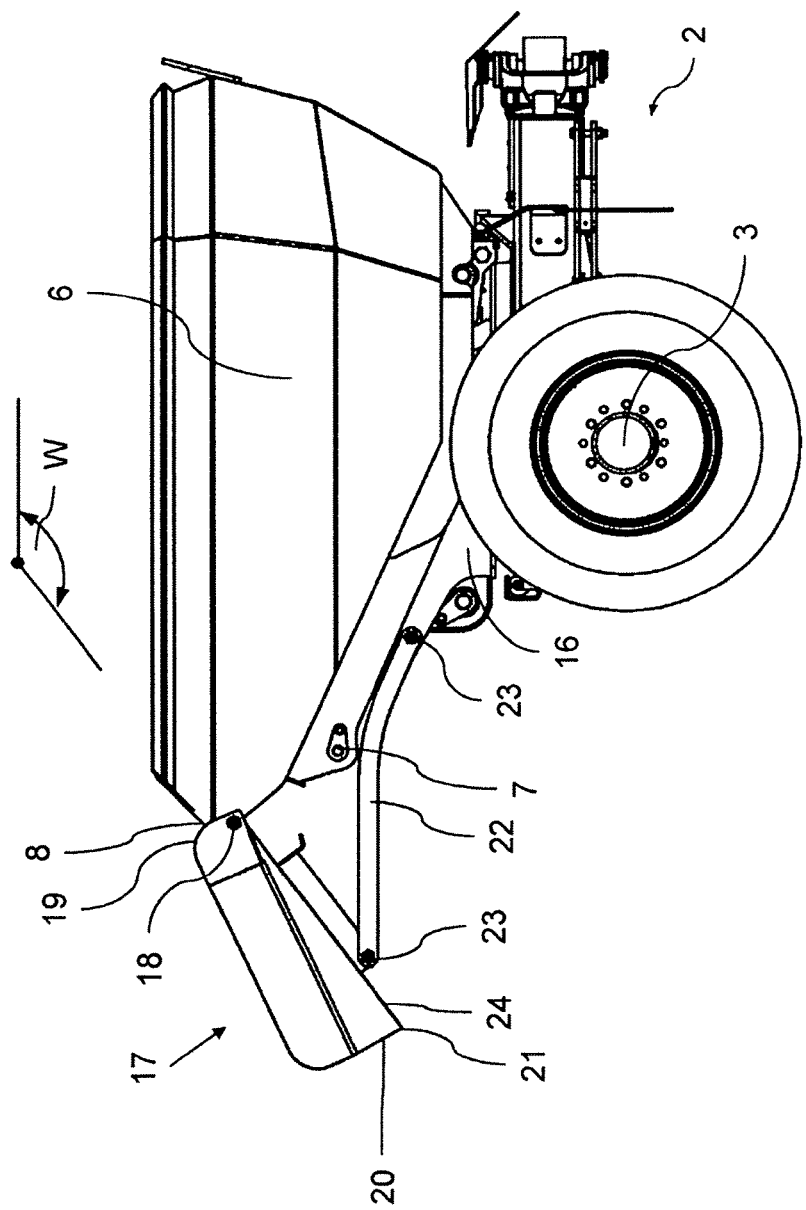
FIG. 3 shows a side view of a skip device with a skip in the transport position (starting position) and with an emptying device.

FIG. 3 shows a side view of the skip unit 2 with the skip 6, which is pivotable about the carrying axle 7.

Figure 4:
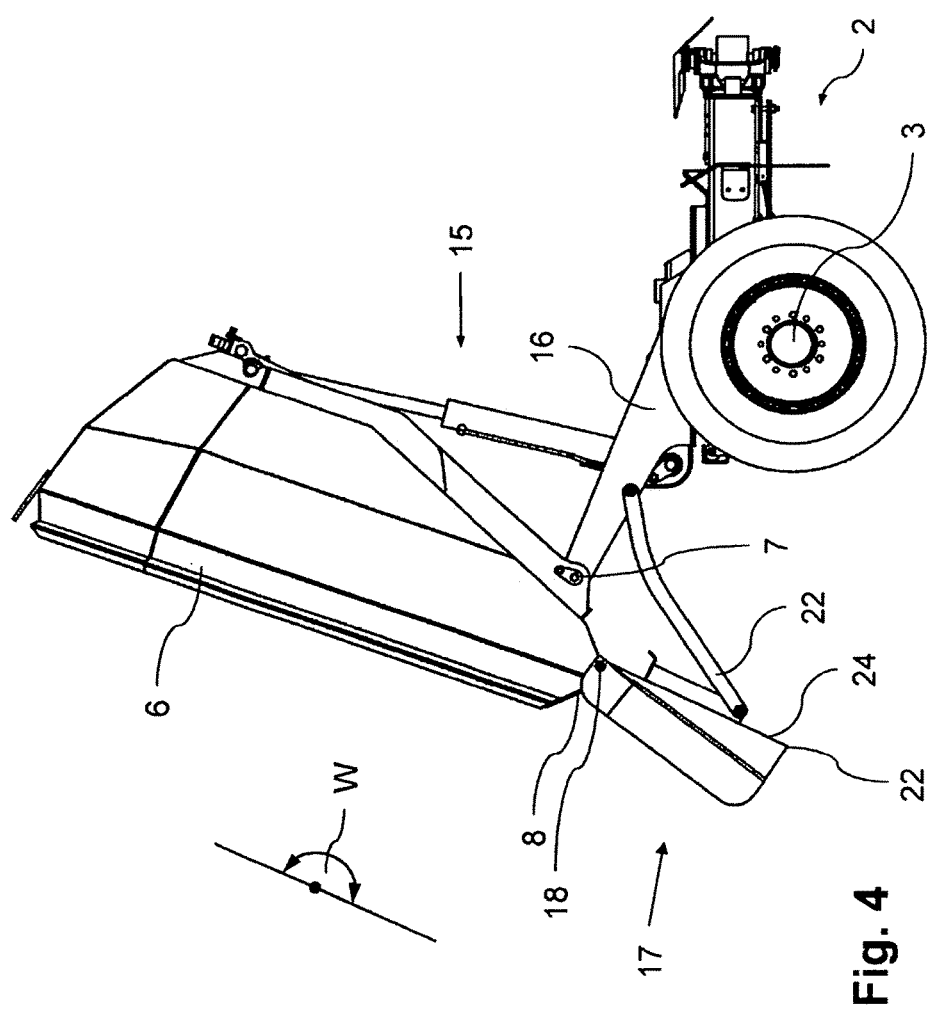
FIG. 4 shows the skip device with the skip in the pivoted-up position (emptying position)

While FIG. 3 shows the skip unit 2 in the starting or transport position, FIG. 4 shows the skip unit 2 with the skip 6 in the fully raised position (emptying position).

The raising of the skip 6 takes place with the aid of a piston-cylinder unit 15 (FIG. 4), which pivots the skip 6 about the carrying axle 7 relative to a carrying device 16 carrying the skip 6.

Provided adjoining the pouring edge 8 is an emptying device 17, which is pivotable about a pivot axle 18 relative to the skip 6. The emptying device 17 has an inlet side 19 and outlet side 20 with an outlet edge 21. The emptying device 17 is not shown in the working vehicle illustrated in FIG. 1 and FIG. 2, but can readily be provided there in the region of the pouring edge 8.

The emptying device 17 is configured in the form of a channel and extends over the entire width of the pouring edge 8, in order to receive all of the bulk material that passes out of the skip 6 via the pouring edge 8 when the skip 6 is raised, and to carry it away from the wheel axle 3.

The pivoting movement of the emptying device 17 relative to the skip 6 is guided by two laterally attached control rods 22 that serve as guide devices or control elements, and of which in each case only one, namely the front control rod 24 in the perspective view, is visible in FIG. 3 and FIG. 4.

The control rods 22 thus couple the underside a the emptying device 17 to the carrying device 16. The coupling of the control rods 22 takes place in this case via axles or joints 23.

As a result of the dimensioning of the control rods 22 and the position of the joints 23, the emptying device 17 is forced to carry out a pivoting movement, which it executes relative to the skip 6 while the skip 6 pivots, as can be seen in particular by comparing FIG. 3 and FIG. 4.

In FIG. 3, a sliding surface 24 (bottom surface of the channel), guiding the bulk material, of the emptying device 17 forms an obtuse angle W relative to the substantially horizontally oriented top edge of the skip 6.

In the pivoted-up position or the skip 6, shown in FIG. 4, this angle W is approximately 180° or somewhat more than 180°, i.e. has been enlarged compared with the lowered transport position in FIG. 3.

By way of the control rods 22, the emptying device 17 is thus forced to carry out a pivoting movement relative to the skip 6, which is directed counter to the pivoting direction of the skip 6. In FIG. 3 and FIG. 4, the skip 6 is pivoted upward, that is to say counterclockwise. The emptying device 17 with the sliding surface 24, by contrast, is pivoted clockwise about the pivot axle 18 relative to the skip 6.

As a result of the coordinated movement, it is possible, at any time, to keep the outlet edge 21, at which the bulk material leaves the skip unit 2, away from the wheel axle 3, in order to avoid soiling. As a result of the pivoting of the channel-like emptying device 17 relative to the skip 6, and in particular as a result of the pivoting movement of the emptying device 17 in the opposite direction relative to the skip 6, the outlet edge 21 is displaced somewhat upward, compared to a situation in which the emptying device 17 were to be connected fixedly to the skip 6 and would at least execute the pivoting movement along therewith. The outlet edge 21 is thus displaced somewhat upward, as a result of which it is possible to prevent the outlet edge 21 from penetrating into the bulk material (for example the liquid concrete) already let out.

Figure 5:
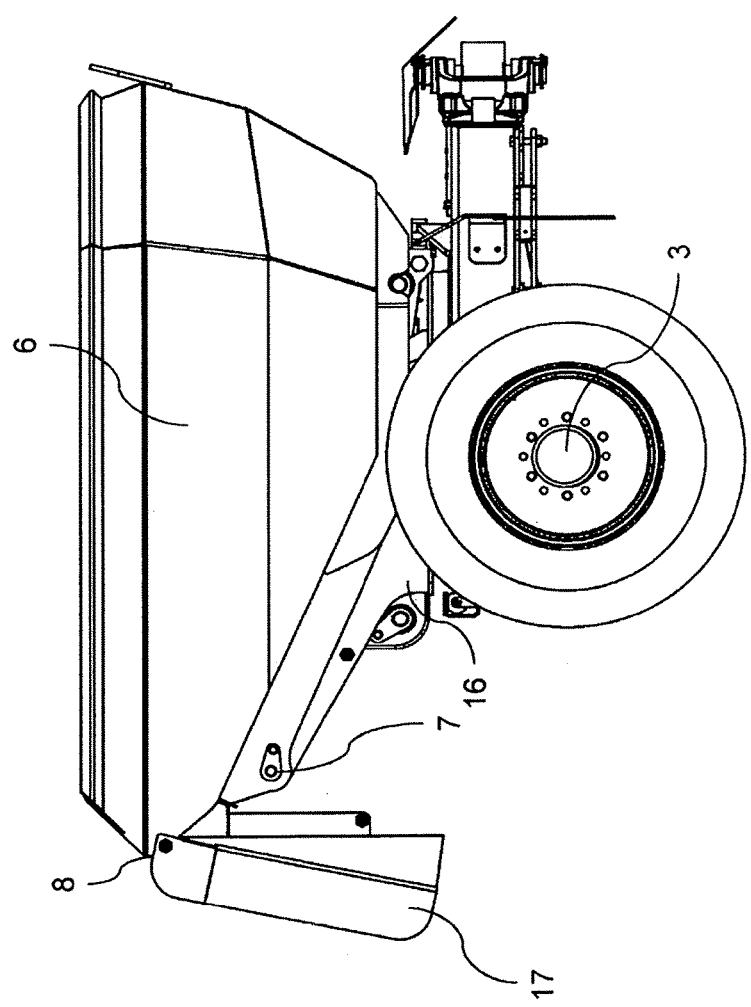
FIG. 5 shows the skip device with the guiding device removed from the emptying device.

FIG. 5 shows a variant in which the control rods 22 have been removed. In this case, on account of its deadweight, the emptying device 17 hangs freely downward and serves as an additional protective guard for protecting the wheel axle 3, without directly guiding the bulk material.

Figure 6:
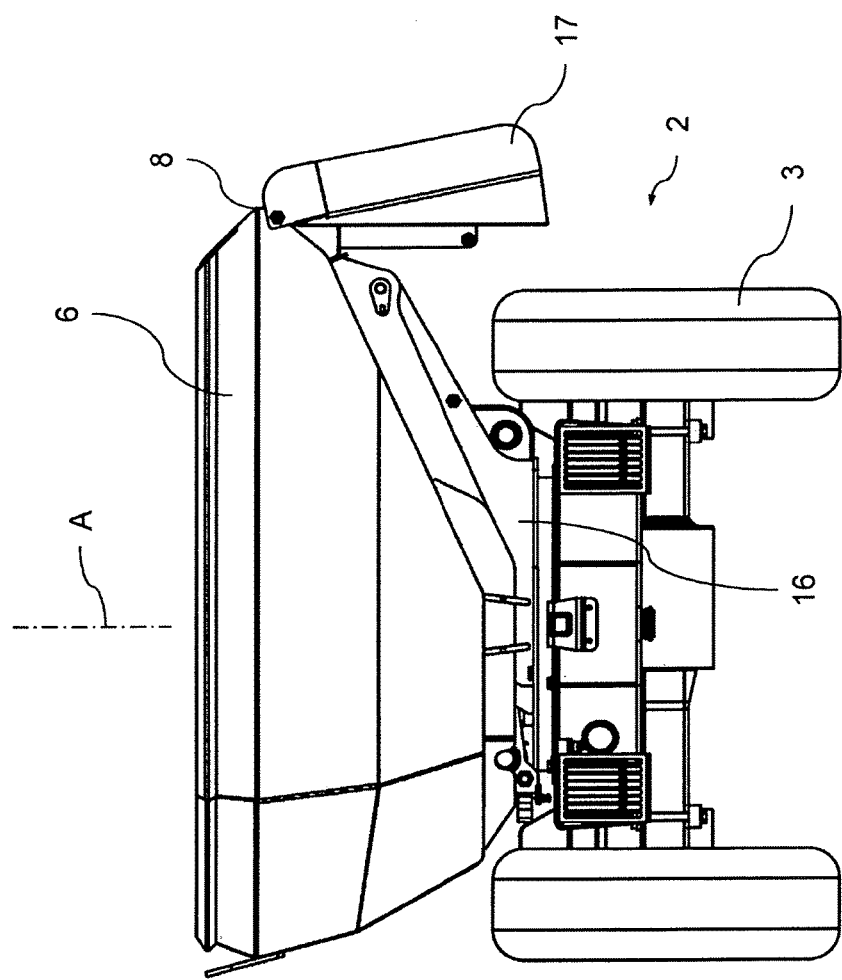
FIG. 6 shows the skip device with a skip pivoted about the vertical axis.

FIG. 6 shows a further embodiment in which the skip 6, together with the carrying device 16, is pivotable about a vertical axis A with respect to the rest of the skip unit 2. The skip 6 can thus be moved into a suitable position with its pouring edge 8 and the emptying device 17, in order to be able to let the bulk material out in a targeted manner. For example, it is possible in this way to let the bulk material out not only in front of or behind the working vehicle, but also laterally thereto—as shown n FIG. 6.

In order to rotate the skip 6 and the carrying device 16, a corresponding rotary drive, not shown in FIG. 6, is provided.

I claim:

1. A skip apparatus for a working vehicle, the skip apparatus comprising:
    a skip that is pivotable upward about a carrying axle and that has a pouring edge via which pourable material is able to be poured out of the skip; and
    an emptying device which is pivotable relative to the skip about a pivot axle during a pivoting movement, the pivot axle being provided on the skip;
    wherein
    the emptying device has an inlet side and an outlet side;
    the inlet side is arranged in a region of the pouring edge such that the pourable material, which is poured out of the skip via the pouring edge, passes into the emptying device via the inlet side; and wherein
    the pivoting movement of the emptying device is guided in a defined manner by a guiding device, wherein the guiding device has a control device which couples the emptying device to a carrying device.

2. The skip apparatus as claimed in claim 1, wherein the control device has at least one control element which is fastened to the emptying device and which is pivotable relative to the carrying device.

3. The skip apparatus as claimed in claim 1, wherein
    the control element is held on the carrying device in a pivotable manner via a control arm axle; and wherein
    the control arm axle extends parallel to the carrying axle and at a distance therefrom.

4. The skip apparatus as claimed in claim 1, wherein the guiding device is removable from at least one of the emptying device and the carrying device, such that the emptying device is freely pivotable relative to the skip.

5. A working vehicle comprising:
    a drive unit which has a drive;

a skip unit which has a skip apparatus, wherein the skip apparatus comprises
a skip that is pivotable upward about a carrying axle and that has a pouring edge via which pourable material is able to be poured out of the skip; and
an emptying device which is pivotable relative to the skip about a pivot axle during a pivoting movement, the pivot axle being provided on the skip;
wherein
the emptying device has an inlet side and an outlet side;
the inlet side is arranged in a region of the pouring edge such that the pourable material, which is poured out of the skip via the pouring edge, passes into the emptying device via the inlet side; and wherein
the pivoting movement of the emptying device is guided in a defined manner by a guiding device; and further comprising
a joint, arranged between the drive unit and the skip unit, for coupling the drive unit to the skip unit such that the drive unit and the skip unit are movable relative to one another about at least one vertical axis (Z) of the working vehicle.

6. The working vehicle as claimed in claim 5, wherein the joint is an articulated swivel joint; and
the articulated swivel joint has a lower ball joint that connects the skip unit to the drive unit, and an upper ball joint that connects the skip unit to the drive unit, the upper ball joint being arranged above the lower ball joint;
a first component of the upper ball joint is fixedly connected to the skip unit; and
wherein
a second component of the upper ball joint is connected to the drive unit via a rod that is movable relative to the drive unit.

7. The working vehicle as claimed in claim 5, wherein the skip is pivotable about the carrying axle;
the carrying axle is arranged to one side of a wheel axle; and wherein
the skip extends from one side of the wheel axle to another side of the wheel axle.

8. A skip apparatus for a working vehicle, the skip apparatus comprising:
a skip that is pivotable upward about a carrying axle and that has a pouring edge via which pourable material is able to be poured out of the skip; and
an emptying device which is pivotable relative to the skip about a pivot axle during a pivoting movement, the pivot axle being provided on the skip:
wherein
the emptying device has an inlet side and an outlet side;
the inlet side is arranged in a region of the pouring edge such that the pourable material, which is poured out of the skip via the pouring edge, passes into the emptying device via the inlet side: and wherein
the pivoting movement of the emptying device is guided in a defined manner by a guiding device, wherein the emptying device is povitally attached to the skip such that, when the emptying device is pivoted downwardly relative to the skip to dump materials, the outlet side and inlet side of the emptying device are positioned downstream of the pouring edge in the direction of material movement so that material moves past the pouring edge of the skip, onto the inlet side of the emptying device, across the emptying device, and off the outlet side of the emptying device.

9. A skip apparatus for a working vehicle, the skip apparatus comprising:
a skip that is pivotable upward about a carrying axle and that has a pouring edge via which pourable material is able to be poured out of the skip; and
an emptying device which is pivotable relative to the skip about a pivot axle during a pivoting movement, the pivot axle being provided on the skip;
wherein
the emptying device has an inlet side and an outlet side;
the inlet side is arranged in a region of the pouring edge such that the pourable material, which is poured out of the skip via the pouring edge, passes into the emptying device via the inlet side; and wherein
the pivoting movement of the emptying device is guided in a defined manner by a guiding device, wherein a carrying device supports the carrying axle and the skip, and wherein the guiding device is coupled to the emptying device and to the carrying device via respective axles or joints.

* * * * *